(12) United States Patent
Liao et al.

(10) Patent No.: US 12,384,137 B2
(45) Date of Patent: Aug. 12, 2025

(54) LAMINATED PACKAGING MATERIAL, OUTER-LAYER ADHESIVE, AND METHOD FOR MANUFACTURING THE SAME

(71) Applicant: NAN YA PLASTICS CORPORATION, Taipei (TW)

(72) Inventors: Te-Chao Liao, Taipei (TW); Shiou-Yeh Sheng, Taipei (TW); Chao-Hsien Lin, Taipei (TW); Ching-Yao Yuan, Taipei (TW); Teng-Ko Ma, Taipei (TW); Chen-Wei Chang, Taipei (TW); Han-Yi Lee, Taoyuan (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 208 days.

(21) Appl. No.: 18/319,434

(22) Filed: May 17, 2023

(65) Prior Publication Data
US 2024/0217212 A1    Jul. 4, 2024

(30) Foreign Application Priority Data
Jan. 3, 2023    (TW) .................................. 112100008

(51) Int. Cl.
*B32B 15/085*    (2006.01)
*B32B 7/12*    (2006.01)
(Continued)

(52) U.S. Cl.
CPC .............. *B32B 15/085* (2013.01); *B32B 7/12* (2013.01); *B32B 15/20* (2013.01); *C09J 123/02* (2013.01);
(Continued)

(58) Field of Classification Search
None
See application file for complete search history.

(56) References Cited

U.S. PATENT DOCUMENTS

| 2014/0370368 A1* | 12/2014 | Kaibin | ..................... B32B 15/08 220/604 |
|---|---|---|---|
| 2019/0010372 A1 | 1/2019 | Nakagawa et al. | |
| 2022/0298623 A1 | 9/2022 | Beer | |

FOREIGN PATENT DOCUMENTS

| JP | 9193284 A | 7/1997 |
|---|---|---|
| JP | 20007748 A | 1/2000 |

(Continued)

OTHER PUBLICATIONS

Sawpan—Polyurethanes from vegetable oils—J.Polym. Res. 2018 (Year: 2018).*

(Continued)

*Primary Examiner* — John Vincent Lawler
(74) *Attorney, Agent, or Firm* — Li & Cai Intellectual Property Office (57) ABSTRACT

A laminated packaging material, an outer-layer adhesive, and a method for manufacturing the same are provided. The outer-layer adhesive is a polyurethane adhesive formed by a reaction between a polyol material and an isocyanate material. The polyol material is an eco-friendly polyester polyol derived from at least one of a recycled polyester material and a biomass raw material. The eco-friendly polyester polyol has a weight-average molecular weight of between 25,000 and 75,000, a number-average molecular weight of between 18,000 and 55,000, and a glass transition temperature of between −30° C. and 60° C. The isocyanate material includes a first isocyanate component that is an adduct formed by adding toluene diisocyanate (TDI) to a polyol having a functionality of between 2 and 4, and a second isocyanate component that is formed by adding isocyanate to a polyol having a long carbon chain and a functionality of between 2 and 4.

8 Claims, 3 Drawing Sheets

(51) Int. Cl.
*B32B 15/20* (2006.01)
*C09J 123/02* (2006.01)
*C09J 175/06* (2006.01)

(52) U.S. Cl.
CPC ....... *C09J 175/06* (2013.01); *B32B 2307/718* (2013.01); *B32B 2553/00* (2013.01); *C09J 2301/312* (2020.08); *C09J 2400/163* (2013.01)

(56) References Cited

FOREIGN PATENT DOCUMENTS

| JP | 20023815 | A | | 1/2002 | | |
|---|---|---|---|---|---|---|
| JP | 2015-024862 | A | † | 2/2015 | | |
| JP | 2019142041 | A | | 8/2019 | | |
| JP | 6610028 | B2 | | 11/2019 | | |
| JP | 202037187 | A | | 3/2020 | | |
| JP | 2020176226 | A | * | 10/2020 | ............. | B32B 27/00 |
| JP | 202199915 | A | | 7/2021 | | |
| JP | 2021109706 | A | | 8/2021 | | |
| JP | 2022163705 | A | | 10/2022 | | |
| WO | WO9523180 | A1 | | 8/1995 | | |
| WO | WO2017142008 | A1 | | 8/2017 | | |
| WO | WO-2018097329 | A1 | * | 5/2018 | ............. | B32B 27/00 |
| WO | WO-2019188335 | A1 | * | 10/2019 | ............. | B32B 27/36 |
| WO | WO-2020179610 | A1 | * | 9/2020 | ............. | B32B 15/08 |

OTHER PUBLICATIONS

Tsumori—WO 2018-097329 A1—3rd party D4—MT—packaging for battery—2018 (Year: 2018).*
Hirota—WO 2019-188335 A1—3rd party D2—MT—reactive adhesive for laminate—2019 (Year: 2019).*
Kobayashi—WO 2020-179610 A1—3rd party D5—MT—adhesive for packaging—2020 (Year: 2020).*
Tsuchiya—JP 2020-176226 A—3rd party D3—MT—adhesive for laminate—2020 (Year: 2020).*

* cited by examiner
† cited by third party

LAMINATED PACKAGING MATERIAL, OUTER-LAYER ADHESIVE, AND METHOD FOR MANUFACTURING THE SAME

CROSS-REFERENCE TO RELATED PATENT APPLICATION

This application claims the benefit of priority to Taiwan Patent Application No. 112100008, filed on Jan. 3, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a laminated packaging material, and more particularly to a laminated packaging material, an outer-layer adhesive, and a method for manufacturing the same.

BACKGROUND OF THE DISCLOSURE

In the conventional technology, an outer-layer adhesive of a laminated packaging material is mainly a formula prepared from a polyester adhesive (which is synthesized from petrochemical raw materials) and a hardener, and is coated onto a metallized film and attached to an outer-layer film. Then, an inner-layer adhesive is coated onto another surface of the metallized film and attached to an inner-layer film. In this way, the laminated packaging material can be obtained. The laminated packaging material can be used as a laminated aluminum-plastic composite material for electronic or medical packaging. However, since the material of the polyester adhesive (which is made from the petrochemical raw materials) is not an eco-friendly raw material, this compromises environmental considerations when such material is used to manufacture the laminated packaging material.

SUMMARY OF THE DISCLOSURE

In response to the above-referenced technical inadequacy, the present disclosure provides a laminated packing material, an outer-layer adhesive, and a method for manufacturing the same that are environmentally conscious and environmentally friendly.

In order to solve the above-mentioned problem, one of the technical aspects adopted by the present disclosure is to provide a laminated packaging material, which includes: an inner-layer polymer film, an outer-layer polymer film, an aluminum-foil metallized film, an inner-layer adhesive, and an outer-layer adhesive. The inner-layer polymer film is at least one of a polyolefin polymer film and a polyvinyl chloride polymer film. The outer-layer polymer film is at least one of a nylon polymer film, a polyester polymer film, and a multilayer nylon/polyester polymer film (a co-extruded film or a blown film). The aluminum-foil metallized film is disposed between the inner-layer polymer film and the outer-layer polymer film. The inner-layer adhesive is a polyolefin adhesive and adhered between the inner-layer polymer film and the aluminum-foil metallized film. The outer-layer adhesive is a polyurethane adhesive and adhered between the outer-layer polymer film and the aluminum-foil metallized film. The outer-layer adhesive is formed by a reaction between a polyol material and an isocyanate material. The polyol material is an eco-friendly polyester polyol, and the eco-friendly polyester polyol is derived from at least one of a recycled polyester material and a biomass raw material. The eco-friendly polyester polyol has a weight-average molecular weight of between 25,000 and 75,000, a number-average molecular weight of between 18,000 and 55,000, and a glass transition temperature of between $-30°$ C. and $60°$ C. The isocyanate material includes a first isocyanate component, the first isocyanate component is an adduct formed by adding toluene diisocyanate (TDI) to a polyol having a functionality of between 2 and 4, and the polyol has a carbon chain length of between C4 and C15.

In one of the possible or preferred embodiments, the isocyanate material further includes a second isocyanate component, and the second isocyanate component is an adduct formed by adding isocyanate to a polyol having a long carbon chain and a functionality of between 2 and 4. The isocyanate can be, for example, at least one of toluene diisocyanate (TDI) and methylene diphenyl diisocyanate (MDI).

In one of the possible or preferred embodiments, the eco-friendly polyester polyol of the outer-layer adhesive has a weight-average molecular weight of between 30,000 and 68,000, a number-average molecular weight of between 21,000 and 48,500, and a glass transition temperature of between $-20°$ C. and $50°$ C.

In one of the possible or preferred embodiments, the eco-friendly polyester polyol of the outer-layer adhesive has an Mw/Mn ratio of between 1.2 and 2.2.

In one of the possible or preferred embodiments, the laminated packaging material further includes a first anti-corrosion treatment layer and a second anti-corrosion treatment layer. The first anti-corrosion treatment layer is disposed between the inner-layer adhesive and the aluminum-foil metallized film, and the second anti-corrosion treatment layer is disposed between the outer-layer adhesive and the aluminum-foil metallized film.

In one of the possible or preferred embodiments, the laminated packaging material is at least one of a food packaging material, a medical packaging material, and an electronic packaging material.

In order to solve the above-mentioned problem, another one of the technical aspects adopted by the present disclosure is to provide an outer-layer adhesive of a laminated packaging material. The outer-layer adhesive is a polyurethane adhesive, and the polyurethane adhesive is formed by a reaction between a polyol material and an isocyanate material. The polyol material is an eco-friendly polyester polyol, and the eco-friendly polyester polyol is derived from at least one of a recycled polyester material and a biomass raw material. The eco-friendly polyester polyol has a weight-average molecular weight of between 25,000 and 75,000, a number-average molecular weight of between 18,000 and 55,000, and a glass transition temperature of between $-30°$ C. and $60°$ C. The isocyanate material includes a first isocyanate component, the first isocyanate component is an adduct formed by adding toluene diisocyanate (TDI) to a polyol having a functionality of between 2 and 4, and the polyol has a carbon chain length of between C4 and C15.

In one of the possible or preferred embodiments, the isocyanate material further includes a second isocyanate component, and the second isocyanate component is an adduct formed by adding isocyanate to a polyol having a long carbon chain and a functionality of between 2 and 4. The isocyanate can be, for example, at least one of toluene diisocyanate (TDI) and methylene diphenyl diisocyanate (MDI).

In order to solve the above-mentioned problem, yet another one of the technical aspects adopted by the present disclosure is to provide a method for manufacturing an outer-layer adhesive. The method includes: providing a polyol material; providing an isocyanate material; and reacting the polyol material with the isocyanate material, so as to form the outer-layer adhesive. The polyol material is an eco-friendly polyester polyol, and the eco-friendly polyester polyol is derived from at least one of a recycled polyester material and a biomass raw material. The eco-friendly polyester polyol is controlled to have a weight-average molecular weight of between 25,000 and 75,000, a number-average molecular weight of between 18,000 and 55,000, and a glass transition temperature of between −30° C. and 60° C. The isocyanate material includes a first isocyanate component, the first isocyanate component is an adduct formed by adding toluene diisocyanate (TDI) to a polyol having a functionality of between 2 and 4, and the polyol has a carbon chain length of between C4 and C15.

In one of the possible or preferred embodiments, in response to the eco-friendly polyester polyol being the recycled polyester material, the eco-friendly polyester polyol is formed by following steps: recycling and alcoholizing the recycled polyester material, and sequentially carrying out an esterification reaction and a polymerization reaction to form the eco-friendly polyester polyol. The recycled polyester material is a recycled polyester flake or a recycled polyester fabric. In response to the eco-friendly polyester polyol being the biomass raw material, the eco-friendly polyester polyol is formed by following steps: providing the biomass raw material, and sequentially carrying out the esterification reaction and the polymerization reaction to form the eco-friendly polyester polyol. The weight-average molecular weight and the number-average molecular weight of the eco-friendly polyester polyol are controlled during processes of the esterification reaction and the polymerization reaction.

Therefore, in the laminated packaging material, the outer-layer adhesive, and the method for manufacturing the same provided by the present disclosure, the eco-friendly polyester polyol is selected for the outer-layer adhesive of the laminated packaging material. When the eco-friendly polyester polyol is manufactured from the recycled polyester material or the biomass raw material (e.g., using the recycled polyester flake for alcoholysis or subjecting acid/alcohol raw materials synthesized from the biomass raw material to the esterification reaction and the polymerization reaction), the weight-average molecular weight, the number-average molecular weight, and the glass transition temperature thereof are controlled to be within a specific range. The eco-friendly polyester polyol is further incorporated with the isocyanate material that has a specific chemical structure, so as to form the outer-layer adhesive. Accordingly, in addition to having good adhesion, good processing moldability, good heat resistance, and good water resistance, the outer-layer adhesive also has an advantage of being environmentally friendly. Moreover, the laminated packaging material of the present disclosure is particularly suitable for being used as food packaging material, medical packaging material, and electronic packaging material.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

Laminated Packaging Material

Figure 1:
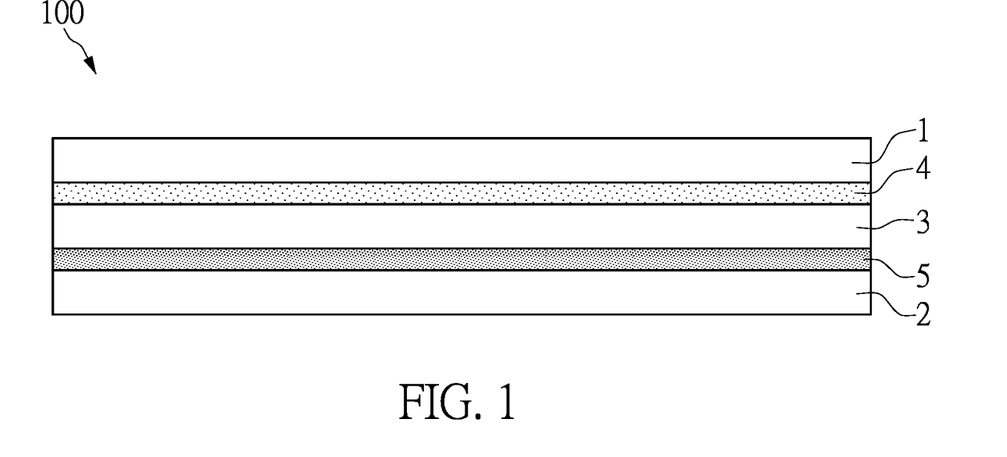
FIG. 1 shows a laminated packaging material according to one embodiment of the present disclosure.

Reference is made to FIG. 1, which shows a laminated packaging material 100 (or referred to as a laminated aluminum-plastic material) according to one embodiment of the present disclosure. The laminated packaging material 100 includes: an inner-layer polymer film 1, an outer-layer polymer film 2, an aluminum-foil metallized film 3, an inner-layer adhesive 4, and an outer-layer adhesive 5.

In terms of a stacking sequence, the aluminum-foil metallized film 3 is disposed between the inner-layer polymer film 1 and the outer-layer polymer film 2, the inner-layer adhesive 4 is adhered between the inner-layer polymer film 1 and the aluminum-foil metallized film 3, and the outer-layer adhesive 5 is adhered between the outer-layer polymer film 2 and the aluminum-foil metallized film 3. That is to say, the outer-layer polymer film 2, the outer-layer adhesive 5, the aluminum-foil metallized film 3, the inner-layer adhesive 4, and the inner-layer polymer film 1 of the laminated packaging material 100 are sequentially stacked from bottom to top.

In terms of material types, the inner-layer polymer film 1 is at least one of a polyolefin polymer film (e.g., a cast polypropylene (CPP) film) and a polyvinyl chloride polymer film (e.g., a polyvinyl chloride (PVC) film). The outer-layer polymer film 2 is at least one of a nylon polymer film, a polyester polymer film, and a multilayer nylon/polyester co-extruded (or blown) polymer film. The aluminum-foil metallized film 3 is an aluminum foil. The inner-layer adhesive 4 is a polyolefin adhesive, and the outer-layer adhesive 5 is a polyurethane adhesive.

In terms of thickness ranges, the inner-layer polymer film 1 has a thickness between 20 μm and 100 μm, the outer-layer polymer film 2 has a thickness between 12 μm and 60 μm, the aluminum-foil metallized film 3 has a thickness between 20 μm and 70 μm, the inner-layer adhesive 4 has a thickness between 1 μm and 5 μm, and the outer-layer adhesive 5 has a thickness between 1 μm and 5 μm. However, the present disclosure is not limited thereto.

The laminated packaging material 100 shown in FIG. 1 is particularly suitable for being used as medical packaging material, but is not limited thereto.

Figure 2:
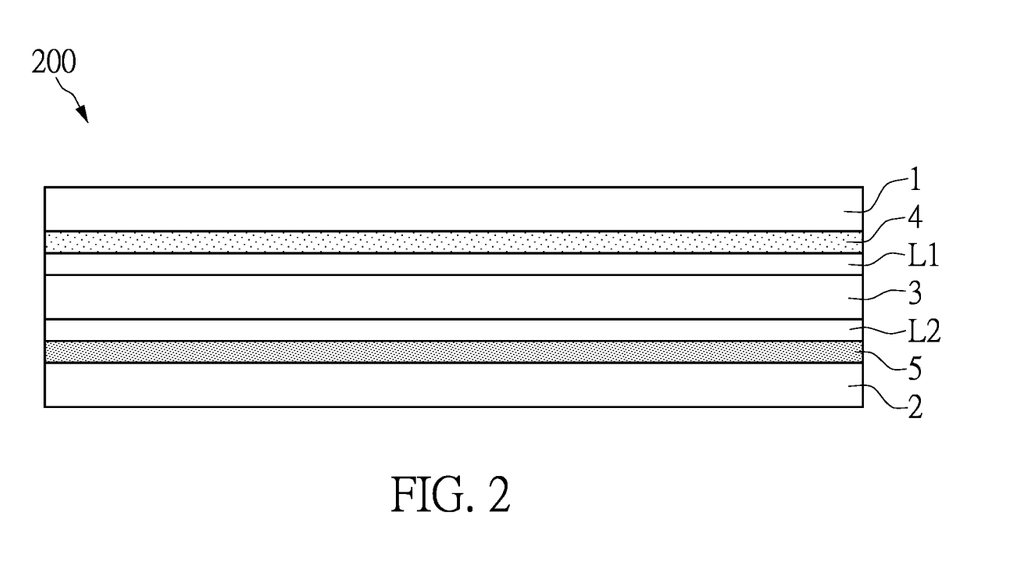
FIG. 2 shows the laminated packaging material according to another embodiment of the present disclosure.

Reference is made to FIG. 2, which shows a laminated packaging material 200 according to another embodiment of the present disclosure. The laminated packaging material 200 includes: the inner-layer polymer film 1, the outer-layer polymer film 2, the aluminum-foil metallized film 3, the inner-layer adhesive 4, and the outer-layer adhesive 5.

A stacking method and the material type of each of the above-mentioned material layers are similar to those of the laminated packaging material 100 of FIG. 1. The difference resides in that the laminated packaging material 200 of FIG. 2 further includes a first anti-corrosion treatment layer L1 and a second anti-corrosion treatment layer L2. The first anti-corrosion treatment layer L1 is disposed between the inner-layer adhesive 4 and the aluminum-foil metallized film 3, and the second anti-corrosion treatment layer L2 is disposed between the outer-layer adhesive 5 and the aluminum-foil metallized film 3.

The first anti-corrosion treatment layer L1 and the second anti-corrosion treatment layer L2 are respectively formed on two outer surfaces of the aluminum-foil metallized film 3 that are opposite to one another, and can be used to prevent corrosion of the aluminum-foil metallized film 3. The material type of the first anti-corrosion treatment layer L1 and the second anti-corrosion treatment layer L2 can be, for example, an inorganic coating or an organic-inorganic composite coating. However, the present disclosure is not limited thereto. For example, the first anti-corrosion treatment layer L1 and the second anti-corrosion treatment layer L2 can be a phosphate treatment layer.

The laminated packaging material 200 shown in FIG. 2 is particularly suitable for being used as electronic packaging material, but is not limited thereto. Overall, the laminated packaging materials 100, 200 provided in various embodiments of the present disclosure are particularly suitable for being used as food packaging material, medical packaging material, or electronic packaging material.

Specifically, as shown in FIG. 1 and FIG. 2, the outer-layer adhesive 5 is adhered between the outer-layer polymer film 2 and the aluminum-foil metallized film 3. The outer-layer adhesive 5 is formed by a crosslinking reaction between a polyol material and an isocyanate material.

In the present embodiment, the polyol material is an eco-friendly polyester polyol, and the eco-friendly polyester polyol is derived from at least one of a recycled polyester material and a biomass raw material.

Since the eco-friendly polyester polyol is used and adhesive properties of an adhesive material needs to be taken into consideration, the eco-friendly polyester polyol is controlled to have a weight-average molecular weight (Mw) of between 25,000 and 75,000, a number-average molecular weight (Mn) of between 18,000 and 55,000, and a glass transition temperature (Tg) of between −30° C. and 60° C. when being manufactured from the recycled polyester material or the biomass raw material. The unit of each of the above-mentioned weight-average molecular weight and the number-average molecular weight is g/mol.

Preferably, the eco-friendly polyester polyol of the outer-layer adhesive 5 is controlled to have a weight-average molecular weight of between 30,000 and 68,000, a number-average molecular weight of between 21,000 and 48,500, and a glass transition temperature of between −20° C. and 50° C. More preferably, the eco-friendly polyester polyol of the outer-layer adhesive 5 is controlled to have a weight-average molecular weight of between 32,000 and 67,000, a number-average molecular weight of between 22,000 and 48,000, and a glass transition temperature of between −18° C. and 48° C.

More specifically, the eco-friendly polyester polyol of the outer-layer adhesive 5 has an Mw/Mn ratio of between 1.2 and 2.2. Preferably, the Mw/Mn ratio is between 1.3 and 2.0. More preferably, the Mw/Mn ratio is between 1.4 and 1.9. However, the present disclosure is not limited thereto.

Since the outer-layer adhesive 5 needs to have a good adhesive physical property, the isocyanate material includes a first isocyanate component. The first isocyanate component is an adduct formed by adding toluene diisocyanate (TDI) to a polyol having a functionality of between 2 and 4, and the polyol has a carbon chain length of between C4 and C15. For example, the polyol can be a polyether polyol or a polyester polyol that has a functionality of 2, 3, or 4 and has the carbon chain length of between C4 and C15. The polyol is preferably the polyether polyol. That is, the adduct is a polyisocyanate component.

In some embodiments of the present disclosure, the isocyanate material further includes a second isocyanate component, and the second isocyanate component is an adduct formed by adding isocyanate to a polyol having a long carbon chain and a functionality of between 2 and 4 (e.g., a polyether polyol having an Mw of between 800 and 2,500). The isocyanate can be, for example, at least one of toluene diisocyanate (TDI) and methylene diphenyl diisocyanate (MDI).

In some embodiments of the present disclosure, additives for synthesis (e.g., at least one of a catalyst, a polymerization inhibitor, a chain extender, and a crosslinking agent) can be added in a micro amount during a synthesis process of the outer-layer adhesive 5. Such techniques are well-known to those of ordinary skill in the art, and will not be reiterated herein.

Based on the above-mentioned configuration, the eco-friendly polyester polyol is selected for the outer-layer adhesive 5 of the laminated packaging materials 100, 200 of the present disclosure. When the eco-friendly polyester polyol is manufactured from the recycled polyester material or the biomass raw material (e.g., using a recycled polyester flake for alcoholysis or subjecting acid/alcohol raw materials synthesized from the biomass raw material to an esterification reaction and a polymerization reaction), the weight-average molecular weight, the number-average molecular weight, and the glass transition temperature thereof are controlled to be within a specific range. The eco-friendly polyester polyol is further incorporated with the isocyanate material that has a specific chemical structure, so as to form the outer-layer adhesive 5. Accordingly, in addition to having good adhesion, good processing moldability, good heat resistance, and good water resistance, the outer-layer adhesive 5 also has advantages of being environmentally friendly and low in cost. Moreover, the laminated packaging materials 100, 200 of the present disclosure are particularly suitable for being used as food packaging material, medical packaging material, and electronic packaging material.

More specifically, the weight-average molecular weight, the number-average molecular weight, and the glass transition temperature of the eco-friendly polyester polyol can be controlled by manufacturing parameters or a monomer selection. The manufacturing parameters can be, for example, an addition sequence, a vacuum degree, reaction time, and/or a reaction temperature. In addition to being environmentally friendly and cost-effective, the eco-friendly polyester polyol is also capable of improving adhesion, moldability, and water resistance of a material through controlling the weight-average molecular weight, the number-average molecular weight, and the glass transition temperature (e.g., the weight-average molecular weight ranging between 25,000 and 75,000, the number-average molecular weight ranging between 18,000 and 55,000, and the glass transition temperature ranging between −30° C. and 60° C.). If the weight-average molecular weight, the number-average molecular weight, and/or the glass transition temperature of the eco-friendly polyester polyol is higher or lower than the numerical range defined above, the outer-layer adhesive 5 may have poor adhesion, poor processing moldability, and poor water resistance (e.g., causing an issue of bubble formation at a high temperature and a high humidity or in water).

The first isocyanate component adopted in the isocyanate material is an adduct formed by adding toluene diisocyanate (TDI) to a polyol having a functionality of between 2 and 4, and the polyol has a carbon chain length of between C4 and C15.

A benzene ring is included in a chemical structure of the toluene diisocyanate, which enables the material to have properties of heat resistance and chemical corrosion resistance. The polyol having a specific carbon chain length (between C4 and C15) can be added to adjust a flexibility of the material and can be used for crosslinking purposes.

If the carbon chain length is too short (e.g., less than C4), an adhesive can become too rigid, such that the processing moldability of the adhesive is poor (e.g., prone to crystallization). Conversely, if the carbon chain length is too long (e.g., more than C15), the adhesive can become so soft as to negatively affect the processing moldability (e.g., difficult to solidify). Furthermore, its heat resistance or chemical resistance may also deteriorate.

As such, partially using the polyol having the specific carbon chain length (between C4 and C15) allows the material to have an improved adhesive property.

The second isocyanate component adopted in the isocyanate material is an adduct formed by adding isocyanate to a polyol having a long carbon chain and a functionality of between 2 and 4. The isocyanate can be, for example, at least one of toluene diisocyanate (TDI) and methylene diphenyl diisocyanate (MDI).

The above-mentioned second isocyanate component is adopted for altering the flexibility of the material (e.g., adjusting a use amount), improving reactivity, and reducing occurrences of yellowing.

Furthermore, through selection of the above-mentioned second isocyanate component, the material can have improved heat resistance, and the occurrences of yellowing can be reduced.

It is worth mentioning that a use proportion of the above-mentioned first and second isocyanate components can be adjusted according to product requirements (e.g., adhesion), and is not limited in the present disclosure.

Outer-layer Adhesive of Laminated Packaging Material

The description above relates to the structure and material characteristics of the laminated packaging material of the present disclosure. It is worth mentioning that the outer-layer adhesive of the above embodiments can also be independently sold.

Specifically, the outer-layer adhesive is a polyurethane adhesive, and the polyurethane adhesive is formed by a reaction between a polyol material and an isocyanate material.

The polyol material is an eco-friendly polyester polyol, and the eco-friendly polyester polyol is derived from at least one of a recycled polyester material and a biomass raw material.

In some embodiments of the present disclosure, the eco-friendly polyester polyol has a weight-average molecular weight of between 25,000 and 75,000, a number-average molecular weight of between 18,000 and 55,000, and a glass transition temperature of between −30° C. and 60° C.

In some embodiments of the present disclosure, the isocyanate material includes a first isocyanate component, the first isocyanate component is an adduct formed by adding toluene diisocyanate (TDI) to a polyol having a functionality of between 2 and 4, and the polyol has a carbon chain length of between C4 and C15. The isocyanate material further includes a second isocyanate component, and the second isocyanate component is an adduct formed by adding isocyanate to a polyol having a long carbon chain and a functionality of between 2 and 4. The isocyanate can be, for example, at least one of toluene diisocyanate (TDI) and methylene diphenyl diisocyanate (MDI). Other material characteristics of the outer-layer adhesive are the same as those described in the above embodiments, and will not be reiterated herein.

The outer-layer adhesive is particularly suitable for being applied to outer-layer film materials that are nylon films, polyester films, or nylon/polyester co-extruded films, and a laminated aluminum-plastic film material coated and attached therewith not only excels in adhesion, processing moldability, heat resistance, and water resistance, but also has advantages of being environmentally friendly and low in costs.

Method for Manufacturing Outer-layer Adhesive

Figure 3:
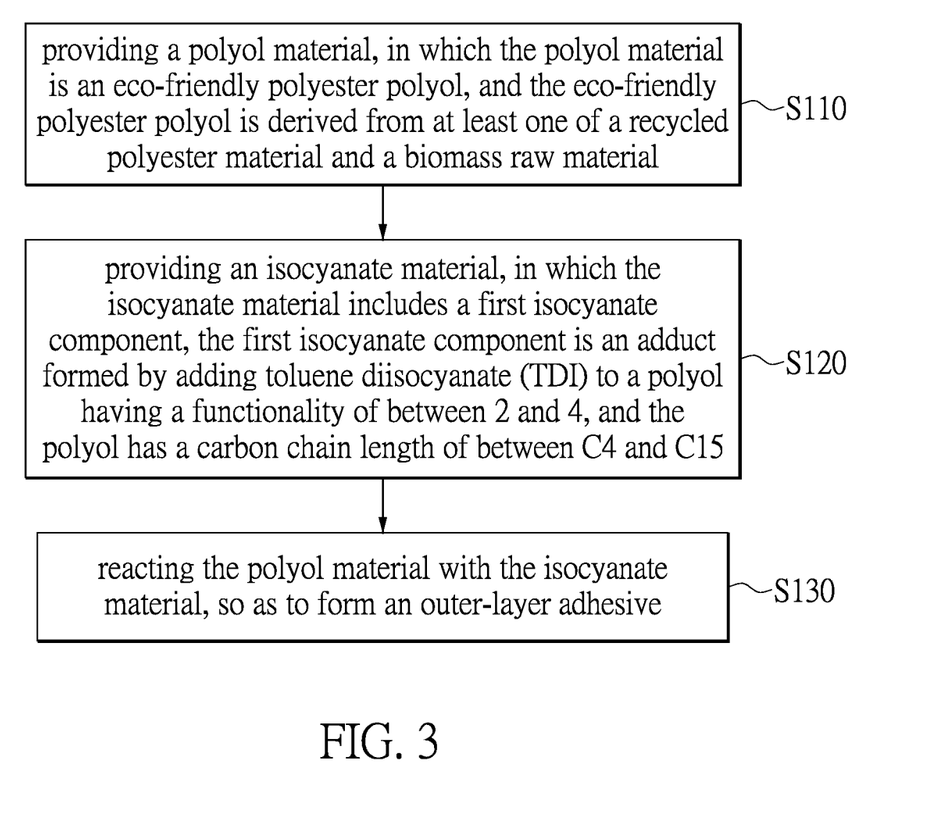
FIG. 3 is a flowchart of a method for manufacturing an outer-layer adhesive according to one embodiment of the present disclosure.

The description above relates to the material characteristics of the outer-layer adhesive of the present disclosure. In the following paragraphs, a method for manufacturing the outer-layer adhesive of the present disclosure will be illustrated. The method includes step S110 to step S130.

It should be noted that a sequence of the steps listed in the present embodiment and actual ways of operation can be adjusted according to practical requirements, and the present disclosure is not limited thereto.

Step S110 includes: providing a polyol material, in which the polyol material is an eco-friendly polyester polyol, and the eco-friendly polyester polyol is derived from at least one of a recycled polyester material and a biomass raw material. The eco-friendly polyester polyol is controlled to have a weight-average molecular weight of between 25,000 and 75,000, a number-average molecular weight of between 18,000 and 55,000, and a glass transition temperature of between −30° C. and 60° C.

Step S120 includes: providing an isocyanate material, in which the isocyanate material includes a first isocyanate component, the first isocyanate component is an adduct formed by adding toluene diisocyanate (TDI) to a polyol having a functionality of between 2 and 4, and the polyol has a carbon chain length of between C4 and C15. The isocyanate material can optionally include a second isocyanate component, and the second isocyanate component is an adduct formed by adding isocyanate to a polyol having a long carbon chain and a functionality of between 2 and 4. The isocyanate can be, for example, at least one of toluene diisocyanate (TDI) and methylene diphenyl diisocyanate (MDI).

Step S130 includes: reacting the polyol material with the isocyanate material (e.g., a crosslinking reaction), so as to form the outer-layer adhesive.

In some embodiments of the present disclosure, if the eco-friendly polyester polyol is the recycled polyester material, the eco-friendly polyester polyol is formed by the following steps: recycling and alcoholizing the recycled polyester material, and sequentially carrying out an esterification reaction and a polymerization reaction to form the eco-friendly polyester polyol. The recycled polyester material is a recycled polyester flake or a recycled polyester fabric.

If the eco-friendly polyester polyol is the biomass raw material, the eco-friendly polyester polyol is formed by the following steps: providing the biomass raw material, and sequentially carrying out the esterification reaction and the polymerization reaction to form the eco-friendly polyester polyol.

In the two preparation methods mentioned above, the weight-average molecular weight and the number-average molecular weight of the eco-friendly polyester polyol are controlled during processes of the esterification reaction and the polymerization reaction.

Experimental Data and Tests

Hereinafter, a detailed description will be provided with reference to Examples 1 to 4 and Comparative Examples 1 and 2. However, the examples below are only provided to aid in understanding of the present disclosure, and are not to be construed as limiting the scope of the present disclosure.

Example 1: 0.948 mol of neopentyl glycol (NPG), 0.190 mol of recycled diethylene glycol (r-DEG), 0.948 mol of recycled ethylene glycol (r-EG), 0.751 mol of recycled terephthalic acid (r-TPA), 0.3 mol of recycled isophthalic acid (r-IPA), and 0.876 mol of adipic acid (AA) are added into a reactor. Then, an antioxidant (0.03 wt % of phosphite esters produced by HONGSHOU as the model 6601 and 0.08 wt % of hindered phenol produced by HONGSHOU as the model 6602) is added, and the reactor is heated to reach 240° C. at an atmospheric pressure. During the heating process, nitrogen is introduced when the reactor is heated to reach about 160° C., and water begins to appear in the reactor after stirring. Further, when the reactor is gradually heated to reach about 240° C., a catalyst (0.08 wt % of antimony acetate and 0.02 wt % of stannous octoate) is added into the reactor, and an esterification reaction is carried out at a normal pressure.

When the water discharged from the reactor reaches 66.35 g, the pressure of the reactor is gradually decreased to carry out negative-pressure dehydration. In the present embodiment, the pressure of the reactor is decreased by 50 Torr about every twenty minutes. After the pressure of the reactor is decreased to 50 Torr, the reactor is vacuumed to about 0 to 10 Torr, and negative-pressure dealcoholization is carried out for two hours. A small amount of nitrogen is further introduced for nitrogen blanketing and purging for two hours, and then vacuum is broken. This is followed by adding a catalyst (0.027 wt % of antimony acetate) and vacuuming from a normal pressure to about 0 to 10 Torr. After two hours of purging with a small amount of nitrogen, the vacuum is broken, and a sample is taken and cooled to a temperature of about 120° C. Then, butanone is gradually added and stirred. After dilution to 50% and cooling, a product (which is a polyester polyol containing recycled components) can be obtained by breaking the vacuum with nitrogen.

According to a formula listed in Table 2 (Table 2 may be referred to for more details), an outer-layer adhesive is prepared. The recycled and eco-friendly polyester polyol is used in cooperation with a first isocyanate component and a second isocyanate component, and an additive type can be at least one of a coupling agent, a leveling agent, a defoaming agent, and an adhesion accelerator. Through a mixer, the above-mentioned materials are blended, coated onto a metallized film, and attached to an outer-layer polymer film. Then, a typical inner-layer adhesive is coated onto an opposite surface of the metallized film and attached to an inner-layer polymer film. This sample is placed in an oven at 60° C. for four days, so as to obtain an electronic or medical packaging product for relevant physical property evaluations.

Example 2: 0.948 mol of neopentyl glycol (NPG), 0.190 mol of bio-diethylene glycol (bio-DEG), 0.948 mol of bio-ethylene glycol (bio-EG), 0.751 mol of terephthalic acid (TPA), 0.3 mol of isophthalic acid (IPA), 0.476 mol of adipic acid (AA), and 0.4 mol of bio-sebacic acid (bio-SA) are added into a reactor. Then, an antioxidant (0.03 wt % of phosphite esters produced by HONGSHOU as the model 6601 and 0.08 wt % of hindered phenol produced by HONGSHOU as the model 6602) is added, and the reactor is heated to reach 240° C. at an atmospheric pressure. During the heating process, nitrogen is introduced when the reactor is heated to reach about 160° C., and water begins to appear in the reactor after stirring. Further, when the reactor is gradually heated to reach about 240° C., a catalyst (0.08 wt % of antimony acetate and 0.02 wt % of stannous octoate) is added into the reactor, and an esterification reaction is carried out at a normal pressure.

When the water discharged from the reactor reaches 66.35 g, the pressure of the reactor is gradually decreased to carry out negative-pressure dehydration. In the present embodiment, the pressure of the reactor is decreased by 50 Torr about every twenty minutes. After the pressure of the reactor is decreased to 50 Torr, the reactor is vacuumed to about 0 Torr, and negative-pressure dealcoholization is carried out for two hours. A small amount of nitrogen is further introduced for nitrogen blanketing and purging for two hours, and then vacuum is broken. This is followed by adding a catalyst (0.027 wt % of antimony acetate) and vacuuming from a normal pressure to about 0 Torr. After two hours of purging with a small amount of nitrogen, the vacuum is broken, and a sample is taken and cooled to a temperature of about 120° C. Then, butanone is gradually added and stirred. After dilution to 50% and cooling, a product (which is a polyester polyol containing biomass components) can be obtained by breaking the vacuum with nitrogen.

According to a formula listed in Table 2 (Table 2 may be referred to for more details), an outer-layer adhesive is prepared. The eco-friendly polyester polyol manufactured from a biomass raw material is used in cooperation with a first isocyanate component and a second isocyanate component, and an additive type is a coupling agent. Other processes of preparing, coating, and attaching the outer-layer adhesive are the same as those described in Example 1, and an electronic or medical packaging product can thus be obtained for relevant physical property evaluations.

Example 3: Example 3 is prepared in a manner substantially the same as that for Example 1. The difference resides in that a polyester polyol (which contains a recycled raw material) adopted in Example 3 is manufactured according to conditions listed in Table 1. Said polyester polyol includes 0.948 mol of neopentyl glycol (NPG), 0.190 mol of recycled diethylene glycol (r-DEG), 0.948 mol of recycled ethylene glycol (r-EG), 0.751 mol of recycled terephthalic acid (r-TPA), 0.3 mol of recycled isophthalic acid (r-IPA), and 0.876 mol of adipic acid (AA). An adopted antioxidant is 0.03 wt % of phosphite esters produced by HONGSHOU as the model 6601 and 0.08 wt % of hindered phenol produced by HONGSHOU as the model 6602. An adopted catalyst is 0.08 wt % of antimony acetate, 0.02 wt % of 1,2,3,4-tetrahydro-1-naphthol (the model T1111), and 0.02 wt % of stannous octoate. An outer-layer adhesive of Example 3 is prepared according to a formula listed in Table 2 (Table 2 may be referred to for more details). The recycled and eco-friendly polyester polyol that has a different molecular weight and a different glass transition temperature (Tg) is used in cooperation with a first isocyanate component and a second isocyanate component, and an additive type is a coupling agent. Other processes of preparing, coating, and attaching the outer-layer adhesive are the same as those described in Example 1, and an electronic or medical packaging product can thus be obtained for relevant physical property evaluations.

Example 4: Example 4 is prepared in a manner substantially the same as that for Example 2. The difference resides in that a polyester polyol (which contains a biomass raw material) adopted in Example 4 is manufactured according to conditions listed in Table 1. Said polyester polyol includes 0.948 mol of neopentyl glycol (NPG), 0.190 mol of bio-diethylene glycol (bio-DEG), 0.190 mol of bio-1,4-butylene glycol (bio-1,4-BG), 0.948 mol of bio-ethylene glycol (bio-EG), 0.751 mol of terephthalic acid (TPA), 0.3 mol of isophthalic acid (IPA), 0.476 mol of adipic acid (AA), 0.4 mol of bio-butyric acid (bio-BA), and 0.4 mol of bio-sebacic acid (bio-SA). An adopted antioxidant is 0.03 wt % of phosphite esters produced by HONGSHOU as the model 6601 and 0.08 wt % of hindered phenol produced by HONGSHOU as the model 6602. An adopted catalyst is 0.08 wt % of antimony acetate, 0.02 wt % of 1,2,3,4-tetrahydro-1-naphthol (the model T1111), and 0.02 wt % of stannous octoate.

An outer-layer adhesive of Example 4 is prepared according to a formula listed in Table 2 (Table 2 may be referred to for more details). The eco-friendly polyester polyol that is manufactured from the biomass raw material and has a different molecular weight and a different glass transition temperature (Tg) is used in cooperation with a first isocyanate component and a second isocyanate component, and an additive type is a coupling agent. Other processes of preparing, coating, and attaching the outer-layer adhesive are the same as those described in Example 2, and an electronic or medical packaging product can thus be obtained for relevant physical property evaluations.

Comparative Example 1: Comparative Example 1 adopts a polyester polyol that is manufactured from a petrochemical raw material according to conditions listed in Table 1. Said polyester polyol includes 0.948 mol of neopentyl glycol (NPG), 0.190 mol of diethylene glycol (DEG), 0.948 mol of ethylene glycol (EG), 0.751 mol of terephthalic acid (TPA), 0.3 mol of isophthalic acid (IPA), and 0.876 mol of adipic acid (AA). An adopted antioxidant is 0.03 wt % of phosphite esters produced by HONGSHOU as the model 6601 and 0.08 wt % of hindered phenol produced by HONGSHOU as the model 6602. An adopted catalyst is 0.08 wt % of antimony acetate and 0.02 wt % of stannous octoate.

An outer-layer adhesive of Comparative Example 1 is prepared according to a formula listed in Table 2 (Table 2 may be referred to for more details). The conventional petrochemical polyester polyol is used in cooperation with a first isocyanate component, and an additive type is a coupling agent. Other processes of preparing, coating, and attaching the outer-layer adhesive are the same as those described in Example 1, and an electronic or medical packaging product can thus be obtained for relevant physical property evaluations.

Comparative Example 2: An outer-layer adhesive of Comparative Example 2 is prepared according to a formula listed in Table 2 (Table 2 may be referred to for more details). A petrochemical polyester polyol commercially available on the market (product: SK215 from the Republic of Korea) is used in cooperation with a first isocyanate component commercially available on the market, and an additive type is a coupling agent. Other processes of preparing, coating, and attaching the outer-layer adhesive are the same as those described in Example 1, and an electronic or medical packaging product can thus be obtained for relevant physical property evaluations.

Manufacturing parameters and conditions of each component are listed in Table 1 below.

The outer-layer adhesives of Examples 1 to 4 and Comparative Examples 1 and 2 are subjected to physical and chemical property tests, so as to obtain physical and chemical properties (e.g., adhesion, moldability, heat resistance, and water resistance) of these outer-layer adhesives.

Relevant test methods are described below, and test results are listed in Table 2.

Adhesion: A sample is taken, and the size of a test specimen is 150 mm×15 mm. In order to peel the test specimen, a blade is used to slightly cut a short side of the test specimen from 20 mm, and the test specimen is slowly stretched after folding and reverse folding along a cut line for several times. When an outer-layer film is completely separated from an aluminum foil for more than 10 mm, a peel test can be carried out. A distance between chucks is 50 mm. The peeling is carried out by the T-peel test, and a test speed is 50 mm/min. As for a working distance, a displacement of at least 50 mm is tested. A numerical unit of the test result of the adhesion (an adhesive strength) is N/mm².

Moldability: A sample is taken, and the size of a test specimen is 100 mm×140 mm. While a same mold (its punching size being 60 mm×90 m) is used for punching, a punching depth is changed for a moldability evaluation. The molded sample is inspected and evaluated in terms of presence/absence of holes or cracks and depth. A numerical unit of the test result of the moldability is mm.

Heat resistance: A sample is taken, and the size of a test specimen is 100 mm×100 mm. The test specimen is placed in an oven at 130° C. for a day, so as to observe presence/absence of bubble formation and delamination.

Water Resistance: A molded sample is placed in a high temperature and high humidity furnace (temperature: 85° C.; relative humidity: 85%) for an endurance test, so as to observe presence/absence of delamination, bleaching, or bubble formation.

TABLE 1

| | Preparation Conditions | | | | | |
|---|---|---|---|---|---|---|
| | Source of polyester polyol | Alcohol | Acid | Alcohol/acid ratio | Anti-oxidant | Catalyst |
| Example 1 | Recycled raw material | NPG r-DEG r-EG | r-TPA r-IPA AA | 1.07 | 6601 6602 | Antimony acetate Stannous octoate |
| Example 2 | Biomass raw material | NPG bio-DEG bio-EG | TPA IPA AA bio-SA | 1.07 | 6601 6602 | Antimony acetate Stannous octoate |
| Example 3 | Recycled raw material | NPG r-DEG r-EG | r-TPA r-IPA AA | 1.02 | 6601 6602 | Antimony acetate T1111 Stannous octoate |
| Example 4 | Biomass raw material | NPG bio-DEG bio-1,4-BG bio-EG | TPA IPA AA bio-BA bio-SA | 1.02 | 6601 6602 | Antimony acetate T1111 Stannous octoate |
| Comparative Example 1 | Petrochemical raw material | NPG DEG EG | TPA IPA AA | 1.07 | 6601 6602 | Antimony acetate Stannous octoate |

| | Temperature | Vacuum degree | Remarks |
|---|---|---|---|
| Example 1 | 240 | 1 Torr | Recycled |
| Example 2 | 240 | 1 Torr | Biomass |
| Example 3 | 250 | 0.5 Torr | TPA/IPA Catalyst Temp Torr |
| Example 4 | 250 | 0.5 Torr | bio-1,4-BG bio-BA Catalyst Temp Torr |
| Comparative Example 1 | 250 | 1 Torr | Petrochemical |

TABLE 2

| | [Experiment Conditions and Test Results] | | | | |
|---|---|---|---|---|---|
| | Item | Example 1 | Example 2 | Example 3 | Example 4 |
| Polyester polyol | Material source of polyester polyol | Recycled raw material | Biomass raw material | Recycled raw material | Biomass raw material |
| | Amount of polyol | 60 wt % | 60 wt % | 70 wt % | 75 wt % |
| | Weight-average molecular weight (g/mol) | 60,000 | 45,000 | 65,000 | 40,000 |
| | Number-average molecular weight (g/mol) | 42,000 | 30,000 | 45,000 | 25,000 |
| | Glass transition temperature (° C.) | 20 | 32 | 25 | 12 |
| First isocyanate component | Selected isocyanate type | TDI | TDI | TDI | TDI |
| | Selected carbon chain length of polyester polyol | C6 | C4 | C10 | C10 |

TABLE 2-continued

[Experiment Conditions and Test Results]

|  |  |  |  |  |  |
|---|---|---|---|---|---|
|  | Formula amount of first isocyanate component | 27.5% | 24.9% | 19.7% | 14.6% |
| Second isocyanate component | Selected isocyanate type | MDI | MDI | TDI | TDI |
|  | Selected molecular weight of polyester polyol | 800 | 2,500 | 800 | 2,500 |
|  | Formula amount of second isocyanate component | 10% | 12% | 8% | 10% |
| Additive | Additive type | Dow 6030 0.5% | BYK077 0.1% | W100 0.3% | BYK399 0.4% |
|  | Amount of additive | 2% | 3% | 2% | 1% |
| Physical properties of outer-layer adhesive | Adhesion (N/mm²) | 5.8 | 5.6 | 6.0 | 5.5 |
|  | Moldability (mm) | 6.5 | 6.2 | 6.3 | 6.4 |
|  | Heat resistance at 130° C. | No bubble formation/no delamination | No bubble formation/no delamination | No bubble formation/no delamination | No bubble formation/no delamination |
|  | Water resistance at 85° C. | No bubble formation/no bleaching/no delamination | No bubble formation/slight bleaching/no delamination | No bubble formation/no bleaching/no delamination | No bubble formation/no bleaching/no delamination |

|  | Item | Comparative Example 1 | Comparative Example 2 |
|---|---|---|---|
| Polyester polyol | Material source of polyester polyol | Petrochemical raw material | Petrochemical raw material |
|  | Amount of polyol | 70 wt % | Commercially available product |
|  | Weight-average molecular weight (g/mol) | 60,000 |  |
|  | Number-average molecular weight (g/mol) | 42,000 |  |
|  | Glass transition temperature (° C.) | 20 |  |
| First isocyanate component | Selected isocyanate type | TDI | Commercially available product |
|  | Selected carbon chain length of polyester polyol | C6 |  |
|  | Formula amount of first isocyanate component | 28% |  |
| Second isocyanate component | Selected isocyanate type | — | — |
|  | Selected molecular weight of polyester polyol | — | — |
|  | Formula amount of second isocyanate component | — | — |
| Additive | Additive type | — | — |
|  | Amount of additive | 2% | 1% |
| Physical properties of outer-layer adhesive | Adhesion (N/mm²) | 5.9 | 5.4 |
|  | Moldability (mm) | 5.8 | 5.7 |
|  | Heat resistance at 130° C. | No bubble formation/no delamination | Slight bubble formation/no delamination |
|  | Water resistance at 85° C. | No bubble formation/slight bleaching/no delamination | Slight bubble formation/slight bleaching/R-edge delamination |

Discussion of Test Results

In terms of physical properties of the outer-layer adhesive, it can be observed that Examples 1 to 4 (whether the recycled raw material or the biomass raw material is selected for the eco-friendly polyester polyol that is used in cooperation with the first isocyanate component and the second isocyanate component) at least have equivalent or improved water resistance and moldability as compared with Comparative Example 1 (in which the petrochemical polyester polyol is used in cooperation with the first isocyanate component), and are superior to Comparative Example 2.

It can be observed from Comparative Examples 1 and 2 that Comparative Example 1 (in which the petrochemical polyester polyol is used in cooperation with the first isocyanate component) has physical properties that are similar to those of Examples 1 to 4 of the present disclosure, but its moldability and water resistance are inferior due to lack of the second isocyanate component. Compared with Comparative Example 2 (in which the polyester polyol commercially available on the market is used in cooperation with the first isocyanate component), the physical properties of Comparative Example 1 are more improved.

BENEFICIAL EFFECTS OF THE EMBODIMENTS

In conclusion, in the laminated packaging material, the outer-layer adhesive, and the method for manufacturing the same provided by the present disclosure, the eco-friendly polyester polyol is selected for the outer-layer adhesive of the laminated packaging material. When the eco-friendly polyester polyol is manufactured from the recycled polyester material or the biomass raw material (e.g., using the recycled polyester flake for alcoholysis or subjecting the acid/alcohol raw materials synthesized from the biomass raw material to the esterification reaction and the polymerization reaction), the weight-average molecular weight, the number-average molecular weight, and the glass transition temperature thereof are controlled to be within a specific range. The eco-friendly polyester polyol is further incorporated with the isocyanate material that has a specific chemical structure, so as to form the outer-layer adhesive. Accordingly, in addition to having good adhesion, good processing moldability, good heat resistance, and good water resistance, the outer-layer adhesive also has advantages of being environmentally friendly and low in costs. Moreover, the laminated packaging material of the present disclosure is particularly suitable for being used as food packaging material, medical packaging material, and electronic packaging material.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A laminated packaging material, comprising:
   an inner-layer polymer film being at least one of a polyolefin polymer film and a polyvinyl chloride polymer film;
   an outer-layer polymer film being at least one of a nylon polymer film, a polyester polymer film, and a multi-layer nylon/polyester polymer film;
   an aluminum-foil metallized film disposed between the inner-layer polymer film and the outer-layer polymer film;
   an inner-layer adhesive being a polyolefin adhesive and adhered between the inner-layer polymer film and the aluminum-foil metallized film; and
   an outer-layer adhesive being a polyurethane adhesive and adhered between the outer-layer polymer film and the aluminum-foil metallized film;
   wherein the outer-layer adhesive is formed by a reaction between a polyol material and an isocyanate material;
   wherein the polyol material is an eco-friendly polyester polyol, and the eco-friendly polyester polyol is derived from at least one of a recycled polyester material and a biomass raw material;
   wherein the eco-friendly polyester polyol has a weight-average molecular weight of between 25,000 and 75,000, a number-average molecular weight of between 18,000 and 55,000, and a glass transition temperature of between −30° C. and 60° C.;
   wherein the isocyanate material includes a first isocyanate component and a second isocyanate component, the first isocyanate component is a first isocyanate adduct obtained by toluene diisocyanate (TDI) reacted with a polyester polyol having a functionality of between 2 and 4 and a carbon chain length ranging from C4 to C10;
   wherein the second isocyanate component is a second isocyanate adduct obtained by at least one of toluene diisocyanate (TDI) and methylene diphenyl diisocyanate (MDI) reacted with a polyester polyol having a functionality of between 2 and 4 and a weight average molecular weight ranging from 800 to 2,500.

2. The laminated packaging material according to claim 1, wherein the eco-friendly polyester polyol of the outer-layer adhesive has a weight-average molecular weight of between 30,000 and 68,000, a number-average molecular weight of between 21,000 and 48,500, and a glass transition temperature of between −20° C. and 50° C.

3. The laminated packaging material according to claim 1, wherein the eco-friendly polyester polyol of the outer-layer adhesive has an Mw/Mn ratio of between 1.2 and 2.2.

4. The laminated packaging material according to claim 1, further comprising a first anti-corrosion treatment layer and a second anti-corrosion treatment layer, wherein the first anti-corrosion treatment layer is disposed between the inner-layer adhesive and the aluminum-foil metallized film, and the second anti-corrosion treatment layer is disposed between the outer-layer adhesive and the aluminum-foil metallized film.

5. The laminated packaging material according to claim 1, wherein the laminated packaging material is at least one of a food packaging material, a medical packaging material, and an electronic packaging material.

6. An outer-layer adhesive of a laminated packaging material, characterized in that the outer-layer adhesive is a polyurethane adhesive, and the polyurethane adhesive is formed by a reaction between a polyol material and an isocyanate material;
   wherein the polyol material is an eco-friendly polyester polyol, and the eco-friendly polyester polyol is derived from at least one of a recycled polyester material and a biomass raw material; wherein the eco-friendly polyester polyol has a weight-average molecular weight of between 25,000 and 75,000, a number-average molecular weight of between 18,000 and 55,000, and a glass transition temperature of between −30° C. and 60° C.;
   wherein the isocyanate material includes a first isocyanate and a second isocyanate component, the first isocyanate component is a first isocyanate adduct obtained by toluene diisocyanate (TDI) reacted with a polyester polyol having a functionality of between 2 and 4 and a carbon chain length ranging from C4 to C10, wherein the second isocyanate component is a second isocyanate adduct obtained by at least one of toluene diisocyanate (TDI) and methylene diphenyl diisocyanate (MDI) reacted with a polyester polyol having a functionality of between 2 and 4 and a weight average molecular weight ranging from 800 to 2,500.

7. A method for manufacturing the outer-layer adhesive of claim 1, comprising providing the polyol material, providing the isocyanate material, and reacting the polyol material with the isocyanate material, so as to form an outer-layer adhesive.

8. The method according to claim 7, wherein, in response to the eco-friendly polyester polyol being the recycled polyester material, the eco-friendly polyester polyol is formed by following steps: recycling and alcoholizing the recycled polyester material, and sequentially carrying out an esterification reaction and a polymerization reaction to form the eco-friendly polyester polyol; wherein the recycled polyester material is a recycled polyester flake or a recycled polyester fabric; wherein, in response to the eco-friendly polyester polyol being the biomass raw material, the eco-friendly polyester polyol is formed by following steps: providing the biomass raw material, and sequentially carrying out the esterification reaction and the polymerization reaction to form the eco-friendly polyester polyol; wherein the weight-average molecular weight and the number-average molecular weight of the eco-friendly polyester polyol are controlled during processes of the esterification reaction and the polymerization reaction.

\* \* \* \* \*